US012694408B2

(12) United States Patent
Foote et al.

(10) Patent No.: US 12,694,408 B2
(45) Date of Patent: Jul. 28, 2026

(54) SYSTEM AND METHOD FOR PARTIAL PAYMENT AUTHORIZATION

(71) Applicant: Wells Fargo Bank, N.A., San Francisco, CA (US)

(72) Inventors: Alexander Foote, West Chester, PA (US); Jennifer Ann Merk, Johnston, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 368 days.

(21) Appl. No.: 18/364,791

(22) Filed: Aug. 3, 2023

(65) Prior Publication Data

US 2025/0045764 A1     Feb. 6, 2025

(51) Int. Cl.
*G06Q 20/40*         (2012.01)
*G06Q 20/20*         (2012.01)
*G06Q 20/24*         (2012.01)

(52) U.S. Cl.
CPC ........... *G06Q 20/403* (2013.01); *G06Q 20/20* (2013.01); *G06Q 20/24* (2013.01); *G06Q 20/405* (2013.01)

(58) Field of Classification Search
CPC ...... G06Q 20/403; G06Q 20/20; G06Q 20/24; G06Q 20/405; G06Q 20/34; G06Q 20/4037
See application file for complete search history.

(56) References Cited

U.S. PATENT DOCUMENTS

| | | | | |
|---|---|---|---|---|
| 8,452,683 | B2 * | 5/2013 | Bayne | G06Q 20/08 |
| | | | | 705/36 R |
| 8,458,086 | B2 * | 6/2013 | Bishop | G06Q 20/102 |
| | | | | 705/40 |
| 8,636,203 | B1 * | 1/2014 | Patterson | G06Q 20/405 |
| | | | | 235/379 |
| 9,508,067 | B2 * | 11/2016 | Brooks | G06Q 20/28 |
| 9,984,372 | B1 * | 5/2018 | Elrod | G06Q 20/405 |
| 10,083,425 | B2 * | 9/2018 | Singhal | G06Q 20/40 |
| 10,592,937 | B2 * | 3/2020 | Turner | G06Q 30/0641 |
| 11,551,234 | B2 * | 1/2023 | Dixit | G06Q 20/405 |
| 11,989,708 | B2 * | 5/2024 | Brunner | H04W 4/14 |
| 2003/0195840 | A1 | 10/2003 | Xu | |

(Continued)

OTHER PUBLICATIONS

KR 20170034732 translation Kwak Se Byung (Year: 2017).*

*Primary Examiner* — Michael Jared Walker
(74) *Attorney, Agent, or Firm* — SCHWEGMAN LUNDBERG & WOESSNER, P.A.

(57) ABSTRACT

A method includes receiving, via a point-of-sale system, a request for payment including a credit account information, a transaction payment amount, and a partial payment indicator, and querying an account database to retrieve an available credit. The method further includes determining that there is an insufficient credit amount to complete the request for payment based on the available credit amount and the transaction payment amount. The method additionally includes determining a partial payment authorization or a denial of the request for payment based on one or more partial payment authorization rules, the credit account information, the transaction payment amount, and the insufficient credit amount. The method also includes communicating, to the point-of-sale system, the partial payment authorization or the denial of the request for payment.

17 Claims, 3 Drawing Sheets

(56) References Cited

U.S. PATENT DOCUMENTS

| | | | | |
|---|---|---|---|---|
| 2007/0055623 A1* | 3/2007 | Ha | .......................... | G06Q 20/02 |
| | | | | 705/39 |
| 2009/0164327 A1* | 6/2009 | Bishop | ................... | G06Q 20/02 |
| | | | | 705/19 |
| 2009/0164329 A1* | 6/2009 | Bishop | ................... | G06Q 20/02 |
| | | | | 705/19 |
| 2009/0164330 A1* | 6/2009 | Bishop | ................... | G06Q 20/02 |
| | | | | 705/19 |
| 2015/0302382 A1* | 10/2015 | Reicher | ............... | G06Q 20/227 |
| | | | | 705/44 |
| 2016/0048814 A1* | 2/2016 | Wagner | ................. | G06Q 20/22 |
| | | | | 705/40 |
| 2019/0347664 A1* | 11/2019 | Agrawal | ............. | G06Q 20/322 |
| 2020/0134631 A1* | 4/2020 | Dixit | ................... | G06Q 20/405 |
| 2020/0265414 A1* | 8/2020 | Koranne | ................ | G06Q 20/34 |
| 2023/0281634 A1* | 9/2023 | Cohn | .................. | G06Q 20/405 |
| | | | | 705/44 |
| 2025/0278718 A1* | 9/2025 | Wind | ................ | G06Q 20/3674 |

* cited by examiner

SYSTEM AND METHOD FOR PARTIAL PAYMENT AUTHORIZATION

TECHNICAL FIELD

The present disclosure generally relates to bill payment systems, and more specifically to partial payment authorization systems.

BACKGROUND

Certain systems include bill payment systems that provide for transactional exchange of funds between a payee and a payor, for example, via a credit card network. For example, a customer initiates a payment transaction via a point of sale (POS) system and the credit card network then authorizes and processes the payment that transfers funds to a merchant. In some cases, the customer may not have sufficient credit left to finish the purchase.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present inventive subject matter and cannot be considered as limiting its scope.

DETAILED DESCRIPTION

Figure 1:
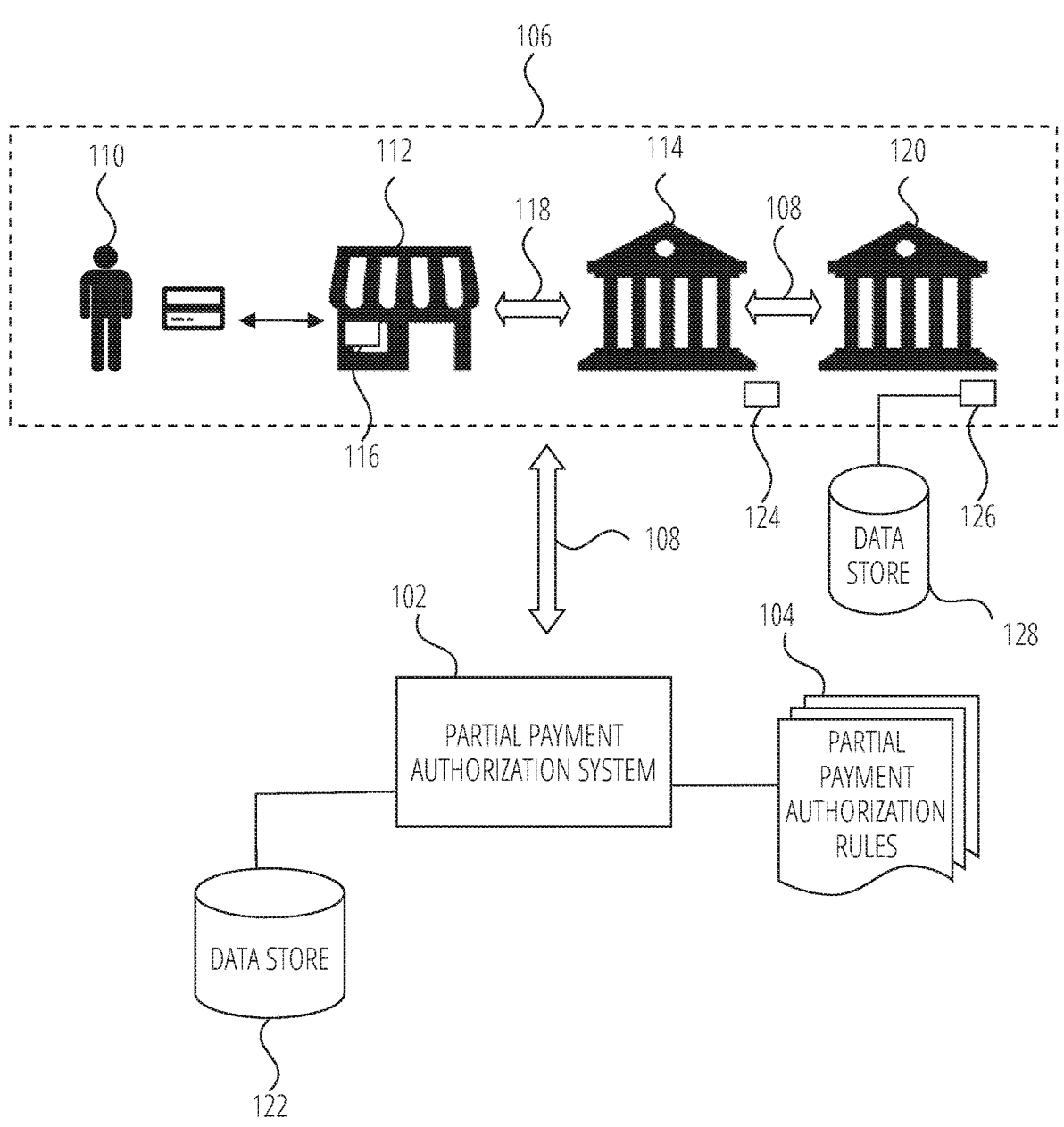
FIG. 1 illustrates an example partial payment authorization system, in accordance with some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The techniques described herein solve various technical problems such as automated payment transaction handling when there is not sufficient credit left on an account. In certain examples, a credit account holder initiates a purchase of goods or services by using a credit account. For example, a merchant's point-of-sale (POS) system transmits a request for payment based on certain credit card information as well as a purchase amount. An acquirer system receives the purchase request and communicates the request for payment to a credit issuer system via a credit intermediary network. The credit issuer then checks available credit and an over-limit pad (e.g., an extra amount of credit over the credit limit) for the credit account. In cases where there is insufficient credit left in the credit account, a partial authorization system is used to determine if partial authorization of payment is to be offered based on a set of partial payment authorization rules. The partial payment authorization rules are separate from a rule that turns on/off partial payment at the account level, and can be used to deny (instead of to approve) partial payment. Indeed, in some examples, the partial authorization system may determine not to proceed with the initial request for payment even though partial authorization of payment could be used to cover a portion of the purchase amount, based on applying the set of partial payment authorization rules.

Partial authorization of payment as used herein refers to authorizing a payment that is less than the entire purchase amount based on the partial authorization payment rules. The credit account holder can then proceed with the payment transaction by adding another credit account or other form of payment to cover a difference between the partial authorization payment amount and the purchase amount. For example, the purchase transaction can include a request via the POS system for the credit issuer system to authorize the transaction via a partial payment if needed. However, the credit issuer system, upon using the partial payment authorization rules, may determine that the transaction should be declined instead. The partial payment authorization rules include merchant category code (MCC) rules, percent of transaction rules, account status rules, product rules, partial payment amount rules, and so on, as further described below. By using the partial payment authorization rules, the techniques described herein provide for more efficient handling of partial payment requests and an improved customer experience.

FIG. 1 illustrates an example partial payment authorization system 102 suitable for applying partial payment authorization rules 104 to certain transactions, according to some embodiments. In the depicted example, the partial payment authorization system 102 is communicatively coupled to one or more entities 106 via a credit network 108. The credit network 108 processes certain transactions between the entities 106 and/or the partial payment authorization system 102, such as purchase transactions, partial payment requests, multiple payments for a single transaction, and so on. In some examples, the credit network 108 includes credit card networks, such as credit card networks acting as intermediary networks between the various entities 106.

In the depicted embodiment, a customer entity 110 engages with a product or service provider entity 112 (e.g., merchant entity) to purchase a good and/or a service. For example, the customer entity 110 presents a credit card to the product or service provider entity 112 as a form of payment, and the product or service provider entity 112 then engages with an acquirer entity 114 to initiate a payment process via certain transactional hardware systems, such as a POS system 116. In the depicted example, the product or service provider entity 112 uses the POS system 116 (e.g., payment terminal with receipt generator) to scan the credit card provided by the customer entity 110, and transmits a purchase authorization attempt (e.g., request for payment) to the acquirer entity 114 (e.g., acquirer server 126 of the acquirer entity 114) via a network 118, such as a POS network. The purchase authorization attempt includes credit account information, such as credit account identification information, security code (e.g., card verification value (CVV)), date of expiration, and/or zip code), a transaction payment amount, one or more MCC codes, and a partial payment indicator communicated from the POS system 116 to the server 126. The partial payment indicator is used to indicate that should there be insufficient credit available to complete the transaction, the product or service provider entity 112 is capable of adding another form of payment (e.g., a second credit card) so that two (or more) forms of payment are combined and used to purchase the good and/or service.

The acquirer entity 114 (e.g., via the acquirer sever 124) then uses the credit network 108 to communicate with an issuer entity 120 so that the issuer entity 120 (e.g., credit card issuer entity) receives, via an issuer sever 126, the purchase authorization attempt information, including the credit account identification information, the security code, the date of expiration, and/or zip code, as well as the transaction payment amount, the MCC code(s), and/or the partial payment indicator. The issuer entity 120 then uses the credit account information to determine if there is a sufficient credit amount plus an overlimit pad in for the credit account of the customer entity 110. For example, a data store 128 (e.g, account database) can be queried via the server 126 based on the credit account information to retrieve an available credit amount and/or an available overlimit pad. The overlimit pad provides for an added credit amount in situations where the credit account's limit is reached. For example, if the transaction payment amount was $100 but there is only $90 of credit available in the credit account, an overlimit pad of $10 can be applied to approve and complete the payment transaction.

In cases where there is an insufficient credit amount, including the overlimit pad, the issuer entity 120 can use the partial payment authorization system 102 to provide partial payment authorization or to deny the request for payment. The partial payment authorization system 102 applies the partial payment authorization rules 104, for example, based on the credit account information, the transaction payment amount, and the insufficient credit amount, to determine if the transaction should proceed as a partial payment transaction or if the transaction should be terminated.

As mentioned earlier, the partial payment authorization rules 104 include merchant category code (MCC) rules. In certain examples, certain MCC codes, such as codes representative of a restaurant or transportation purchase are detected, and the transaction terminated if the restaurant or transportation codes are present. In these MCC cases, a customer experience has been found to be better if the entire transaction is declined as opposed to asking the customer entity 110 for multiple forms of payment. The partial payment authorization rules 104 additionally include percent of transaction rules that use a percentage of the transaction payment amount to deny partial payment authorization. For example, if the partial payment amount is below 40% of the transaction payment amount, then the partial payment authorization is denied and the transaction is terminated. It is to be understood that other percentages can be used, such as 10%, 15%, 20%, 25% of the transaction payment amount.

The partial payment authorization rules 104 further include account status rules, where a status of the credit account that is being used to service the transaction can be retrieved, e.g., from a data store 122. Statuses such the credit account being delinquent (e.g., because of missed payments) will result in the denial of partial payment and the termination of the transaction. The partial payment authorization rules 104 additionally include product rules. That is, a credit account belongs to a product category, such as standard credit card. Other product categories, such as business credit cards, branded credit cards, and so on, will trigger the product rule to deny partial payment authorization. The partial payment authorization rules 104 also include partial payment amount rules. That is, if the transaction payment amount is within a certain range of the partial payment amount, then the partial payment authorization will be denied. For example, if the transaction payment amount is within $10 or less of the partial payment amount then the partial payment authorization will be denied. The partial payment authorization rules 104 also include a testing rule. The testing rule is used to turn on and off the partial payment rules for testing purposes. For example, a group of test users can be created and stored in the data store 122. The partial payment system, when the testing rule is set "on," can then retrieve the group of test users and only apply the other partial payment authorization rules 104 to credit accounts of the test users.

Once the partial payment authorization system 102 applies the partial payment authorization rules 104, for example, to determine if there is partial authorization or if there should be a denial of the transaction, the partial authorization derivation (e.g., partial payment is authorized or not authorized) is communicated back to the product or service provider entity 112 (e.g., via the POS system 116 communicating with the partial payment authorization system 102). If the partial payment is authorized, the product or service provider entity 112 then offers the partial payment option to the customer entity 110. The customer entity 110 can then accept the partial payment option and use two or more forms of payment. Alternatively, the customer entity 110 can decline the partial payment option and use another form of payment. By providing for the partial payment authorization rules 104, the techniques described herein improve on partial payment efficiency and customer experience. It should be noted that, in some embodiments, the partial payment authorization system 102 is included as a software system of the server 126, and the data store 122 is included as part of the data store 128.

Figure 2:
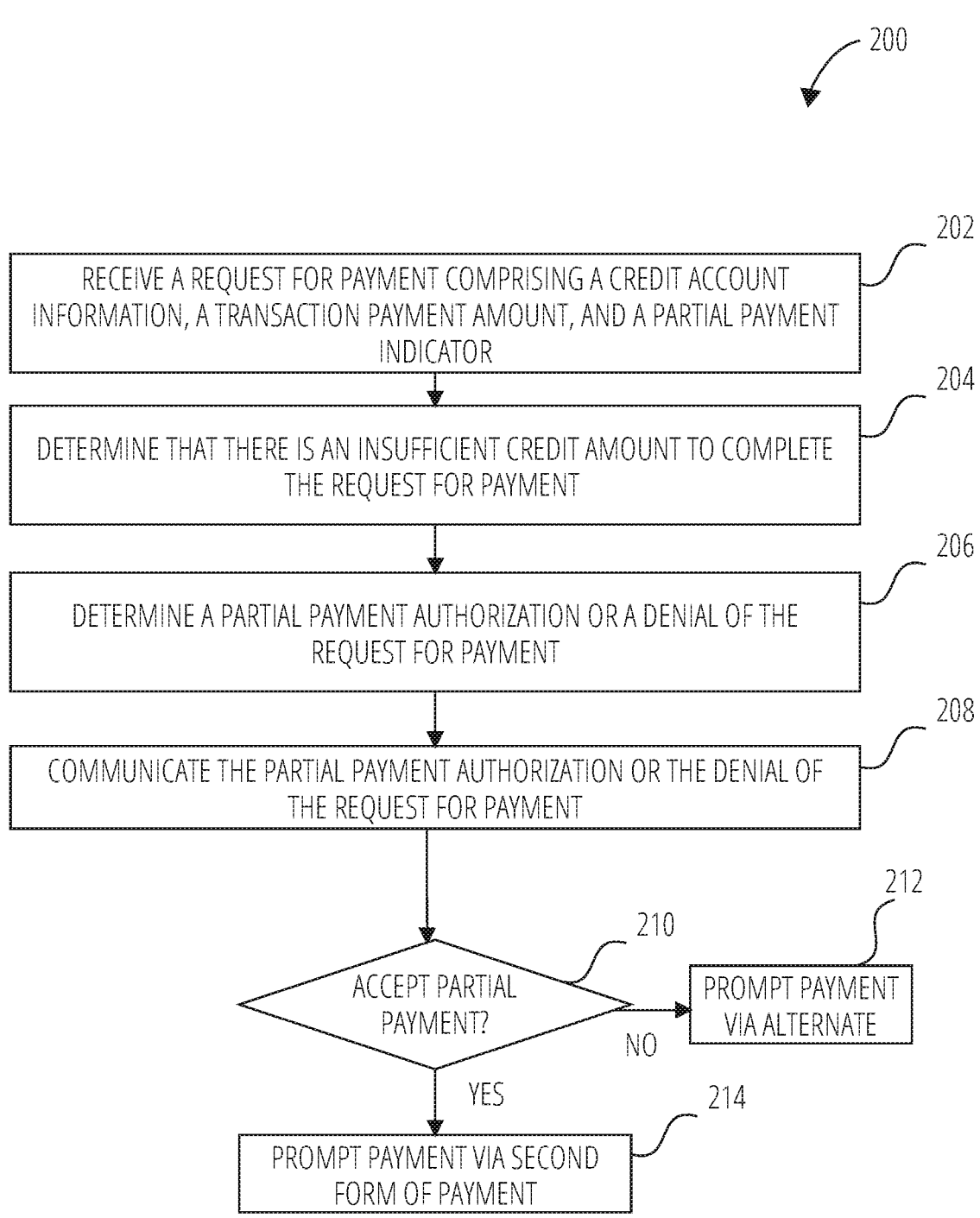
FIG. 2 illustrates a flowchart of an example process for partial payment authorization, in accordance with some embodiments.

FIG. 2 is a flowchart of an example process 200 suitable for responding to a request for partial payment authorization, according to certain embodiments. In some embodiments, the process 200 is implemented as computer code or instructions executable via the partial payment authorization system 102. In the depicted embodiment, the process 200, receives, at block 202, a request for payment. In some examples, the request for payment is communicated via the POS system 116 during a transaction, such as the purchase of a good and/or a service, for example, to the acquirer 114 (e.g., via the server 124) and subsequently to the issuer entity 120 (e.g, via the server 126). The request for payment includes a credit account information, a transaction payment amount (e.g., purchase price to pay), and a partial payment indicator. In some examples, the request for payment also includes an MCC code. The partial payment indicator is used to indicate that should there be insufficient credit available to complete the transaction, the product or service provider entity 112 is capable of adding another form of payment (e.g., a second credit card) so that two (or more) forms of payment are combined and used to purchase the good and/or service.

At block 204, the process 200 determines that there is an insufficient credit amount to complete the request for payment based on the credit account information and the transaction payment amount. For example, the credit account information is used to retrieve (via the server 126 querying the data store 128) an available credit amount and any overlimit pad for the credit account. That is, the process 200 can query an account database such as the data store 128 to determine the available credit amount and/or overlimit pad for a credit account. If the overlimit pad added to the available credit amount is less than the transaction payment amount, then an insufficient credit amount exists.

At block 206, process 200 determines a partial payment authorization or a denial of the request for payment based on one or more partial payment authorization rules, the credit account information, the transaction payment amount, and the insufficient credit amount. Applying the partial payment authorization rules 104 includes applying one or more merchant category code (MCC) rules. For example, the MCC code is used to determine if the transaction incoming from the POS system 116 is a restaurant or a transportation transaction, such as a transaction involving paying for a meal or paying for a ride. If the MCC code is a restaurant or transportation code, the process 200 will deny the request for payment. The MCC codes used to deny the request for payment are configurable, for example, via a graphical user interface (GUI) provided by the partial payment authorization system 102 used to reconfigure the partial payment authorization rules by changing, for example, certain parameters. For example, a listbox can be used to list all MCC codes that will result in the denial of the request for payment.

Applying the percent of transaction rules involves the use of a percentage of the transaction payment amount. For example, if the partial payment amount is below 40% of the transaction payment amount, then the partial payment authorization is denied (e.g., by issuing a denial of the request for payment) and the transaction is terminated. The percentage used is configurable, for example, via the GUI provided by the partial payment authorization system 102. A user can enter an amount, such as 10%, 20%, 30%, and so on, to set the desired percentage.

Applying the partial payment authorization rules 104 further includes applying account status rules. To apply the account status rules, the process 200 will retrieve a status for the credit account that is being used to pay for the good and/or service. Statuses such the credit account being delinquent (e.g., because of missed payments) or NEQ will result in the denial of partial payment and the termination of the transaction. Applying the partial payment authorization rules 104 additionally includes applying product rules. Accordingly, a product category is retrieved for the credit account and used to determine if the transaction should be terminated. Product categories, such as business credit cards, branded credit cards, and so on, will trigger the product rule to deny partial payment authorization and terminate the transaction.

Applying the partial payment authorization rules 104 also includes applying partial payment amount rules. Accordingly, if the transaction payment amount is within a certain range of the partial payment amount, then the partial payment authorization will be denied. For example, if the transaction payment amount is within $10 or less of the partial payment amount then the partial payment authorization will be denied. In some examples, applying the partial payment authorization rules 104 also includes applying a testing rule. As mentioned previously the testing rule is used to turn on and off the partial payment authorization rules for testing purposes for a group of users. When the testing rule is turned on, the process 200 only applies the other partial payment authorization rules 104 to credit accounts of certain test users. In some examples, the process 200 analyzes the credit accounts involved in the test to determine if using the partial payment authorization rules has resulting in higher credit usage, lower credit usage, or equal credit usage for individual test users and/or for groups of test users. Parameters in the partial payment authorization rules 104 can then be changed and retested, such as changing MCC codes, percentage of the transaction payment amount, statuses for credit accounts, product types, partial payment amounts, or a combination thereof, and the partial payment authorization rules can then be retested.

The process 200 then communicates, at block 208, the partial payment authorization or the denial of the request for payment. For example, the partial payment authorization or the denial of the request for payment can be communicated to the POS system 116. The process 200 then determines, at decision 210, if the customer entity 110 accepts the partial payment. If the partial payment authorization is accepted then the process 200 prompts, at block 214, the customer entity 110 for a second form of payment used to pay the remainder amount (e.g., the difference between the transaction payment amount and the partial payment amount). The second form of payment is then used to cover a remaining difference between the transaction payment amount and the partial payment amount authorized. If the customer entity 110 does not accept or otherwise rejects the partial payment authorization, the process 200 then prompts, at block 212, for an alternate form of payment to use (e.g., another credit card, cash, and so on). It is to be understood that the process 200 can be implemented as computer code or instructions executable in the partial payment authorization system 102, the server 124, and/or the server 126.

Figure 3:
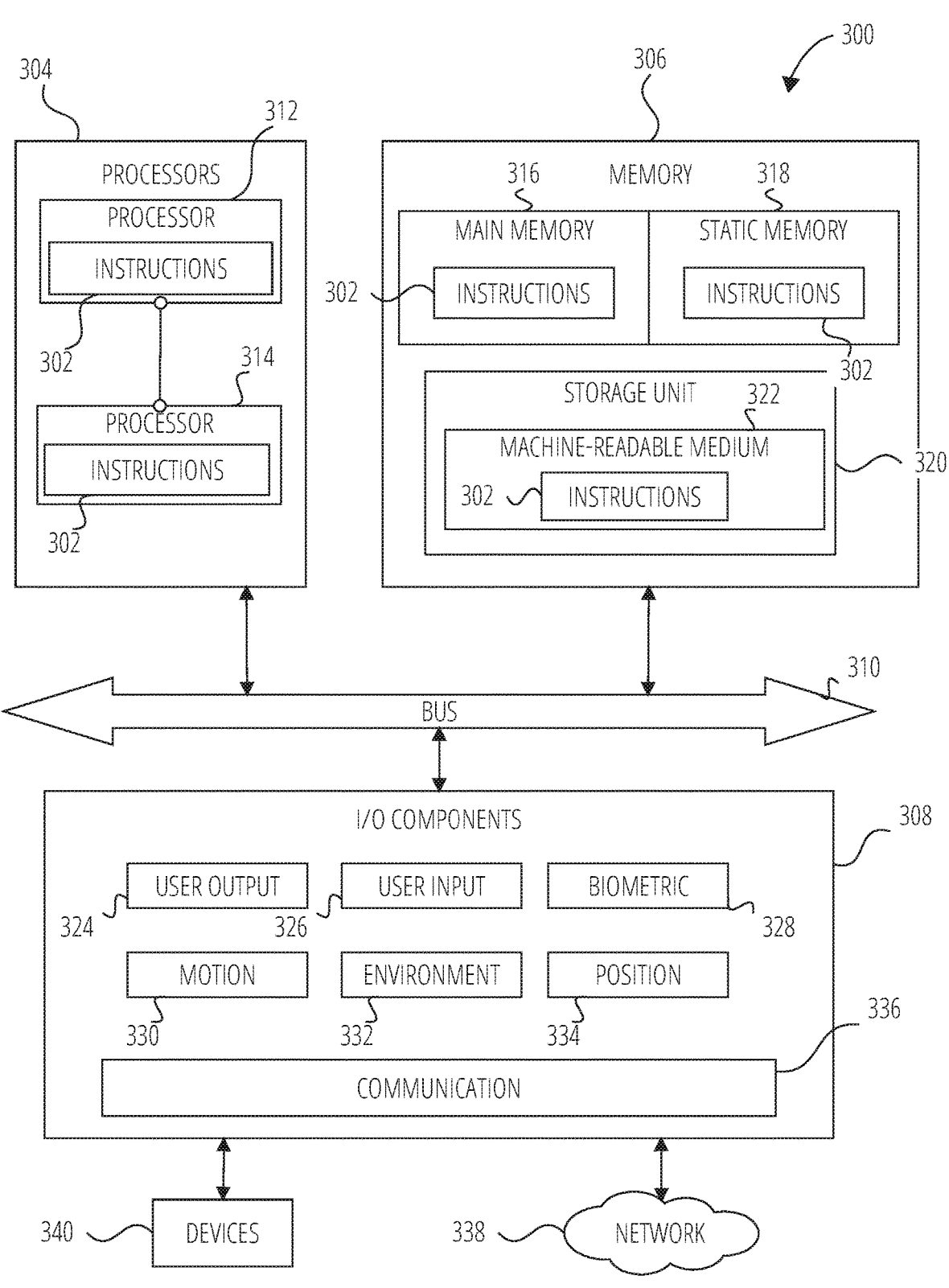
FIG. 3 is a block diagram depicting a machine suitable for executing instructions via one or more processors, according to some embodiments.

FIG. 3 is a diagrammatic representation of a machine 300 within which instructions 302 (e.g., software, a program, an application, an applet, an app, or other executable code) for causing the machine 300 to perform any one or more of the methodologies discussed herein may be executed. For example, the instructions 302 may cause the machine 300 to execute any one or more of the processes or methods described herein, such as the process 200. The instructions 302 transform the general, non-programmed machine 300 into a particular machine 300, e.g., the partial payment authorization systems 102, programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 302, sequentially or otherwise, that specify actions to be taken by the machine 300. Further, while a single machine 300 is illustrated, the term "machine" shall also be taken to include a collection of machines that individually or jointly execute the instructions 302 to perform any one or more of the methodologies discussed herein. In some examples, the machine 300 may also comprise both client and server systems, with certain operations of a particular method or algorithm being performed on the server-side and with certain operations of the particular method or algorithm being performed on the client-side.

The machine 300 may include processors 304, memory 306, and input/output I/O components 308, which may be configured to communicate with each other via a bus 310. In an example, the processors 304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 312 and a processor 314 that execute the instructions 302. The term "processor" is intended to include multi-core processors that may comprise two or more independent processors (sometimes referred to as "cores") that may execute instructions contemporaneously. Although FIG. 3 shows multiple processors 304, the machine 300 may include a single processor with a single-core, a single processor with multiple cores (e.g., a multi-core processor), multiple processors with a single core, multiple processors with multiples cores, or any combination thereof.

The memory 306 includes a main memory 316, a static memory 318, and a storage unit 320, both accessible to the processors 304 via the bus 310. The main memory 316, the static memory 318, and storage unit 320 store the instructions 302 embodying any one or more of the methodologies or functions described herein. The instructions 302 may also reside, completely or partially, within the main memory 316, within the static memory 318, within machine-readable medium 322 within the storage unit 320, within at least one of the processors 304 (e.g., within the processor's cache memory), or any suitable combination thereof, during execution thereof by the machine 300.

The I/O components 308 may include a wide variety of components to receive input, provide output, produce output, transmit information, exchange information, capture measurements, and so on. The specific I/O components 308 that are included in a particular machine will depend on the type of machine. For example, portable machines such as mobile phones may include a touch input device or other such input mechanisms, while a headless server machine will likely not include such a touch input device. It will be appreciated that the I/O components 308 may include many other components that are not shown in FIG. 3. In various examples, the I/O components 308 may include user output components 324 and user input components 326. The user output components 324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 308 may include biometric components 328, motion components 330, environmental components 332, or position components 334, among a wide array of other components. For example, the biometric components 328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 330 include acceleration sensor components (e.g., accelerometer), gravitation sensor components, rotation sensor components (e.g., gyroscope).

The environmental components 332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 334 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 308 further include communication components 336 operable to couple the machine 1200 to a network 338 or devices 340 via respective coupling or connections. For example, the communication components 336 may include a network interface component or another suitable device to interface with the network 338. In further examples, the communication components 336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 340 may be another machine or any of a wide variety of peripheral devices (e.g., a peripheral device coupled via a universal serial bus (USB) port), internet-of-things (IoT) devices, and the like.

Moreover, the communication components 336 may detect identifiers or include components operable to detect identifiers. For example, the communication components 336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 336, such as location via Internet Protocol (IP) geolocation, location via Wi-Fi® signal triangulation, location via detecting an NFC beacon signal that may indicate a particular location, and so forth.

The various memories (e.g., main memory 316, static memory 318, and memory of the processors 304) and storage unit 320 may store one or more sets of instructions and data structures (e.g., software) embodying or used by any one or more of the methodologies or functions described herein. These instructions (e.g., the instructions 302), when executed by processors 304, cause various operations to implement the disclosed examples.

The instructions 302 may be transmitted or received over the network 338, using a transmission medium, via a network interface device (e.g., a network interface component included in the communication components 336) and using any one of several well-known transfer protocols (e.g., hypertext transfer protocol (HTTP)). Similarly, the instructions 302 may be transmitted or received using a transmission medium via a coupling (e.g., a peer-to-peer coupling) to the devices 340.

The techniques described herein provide for online delegation of bill payment accounts. An account owner for a bill payment account or a user having a delegate full access role to the bill payment account can delegate various roles for bill payment purposes. Delegate roles provide for added security by compartmentalizing bill payment account access. Delegate roles include a delegate full access role providing for a creation of a money transfer, for a viewing of bill payment account activity, for an editing of an existing money transfer, and/or for an updating of a monetary account for an existing money transfer. A view only delegate role provides for the viewing of bill payment activity. An edit only delegate role providing for the updating the monetary amount for the existing money transfer. A to-be-delegate user is selected and verified, and a communication requesting bill payment delegation is then sent to the to-be-delegate user. The to-be-delegate user can then accept the bill payment delegation and become a delegate. The delegate can then access the bill payment account to perform certain actions (e.g., view account activity, edit account activity, create a new bill payment fund transfer). Delegate activity is captured (e.g., via a log), and presented for viewing.

What is claimed is:

1. A partial payment authorization system, comprising:
one or more hardware processors; and
at least one memory storing instructions that cause the one or more hardware processors to perform operations comprising:
receiving, from a point-of-sale system comprising a payment terminal communicatively coupled to the partial payment authorization system, a request for payment comprising a credit account information, a transaction payment amount, and a partial payment indicator;
querying an account database communicatively coupled to the partial payment authorization system, to retrieve an available credit amount based on the credit account information;
determining that there is an insufficient credit amount to complete the request for payment based on the available credit amount and the transaction payment amount;
determining a partial payment authorization or a denial of the request for payment based on one or more partial payment authorization rules, the credit account information, the transaction payment amount, and the insufficient credit amount, wherein the determining the denial of the request for payment comprises applying a merchant category code (MCC) rule, wherein applying the MCC comprises:
automatically determining, by comparing a MCC included in the request for payment, that the MCC is representative of a transportation payment or a dining payment; and
automatically determining that the request for payment should result in the denial of the request for payment when the MCC is representative of the transportation payment or of the dining payment and when it is determined that there is an insufficient credit amount to complete the request for payment; and
communicating, to the payment terminal, the partial payment authorization or the denial of the request for payment, wherein the one or more partial payment authorization rules comprise the MCC rule, a percent of transaction rule, an account status rule, a product rule, a partial payment amount rule, or a combination thereof, wherein the payment terminal is configured to scan a credit card for the credit account information, the transaction payment amount, and the partial payment indicator, and to communicate the request for payment to the partial payment authorization system.

2. The partial payment authorization system of claim 1, wherein the one or more partial payment authorization rules comprise a testing rule, and wherein the operations comprise applying the one or more partial payment authorization rules to a test group of users when the testing rule is turned on.

3. The partial payment authorization system of claim 2, wherein the operations comprise, analyzing credit account usage of the test group of users to determine if there is higher credit usage, lower credit usage, or equal credit usage when the testing rule is turned on.

4. The partial payment authorization system of claim 1, wherein the operations further include the determining resulting in an indication of the denial of the request for payment based on the MCC rule comprises when an MCC code transmitted with the request for payment comprises a restaurant code or a transportation code.

5. The partial payment authorization system of claim 1, wherein the operations further include the determining resulting in an indication of the denial of the request for payment based on the percent of transaction rule when a partial payment amount is below a percentage of the transaction payment amount.

6. The partial payment authorization system of claim 1, wherein the operations further include the determining resulting in an indication of the denial of the request for payment based on the account status rule when a status of a credit account associated with the credit account information is a delinquent status.

7. The partial payment authorization system of claim 1, wherein the operations further include the determining resulting in an indication of the denial of the request for payment based on the product rule when a credit card associated with the credit account information is not in a standard credit card product category.

8. The partial payment authorization system of claim 1, wherein the operations further include the determining resulting in an indication of the denial of the request for payment based on the partial payment amount rule when the transaction payment amount is within a range of the partial payment amount.

9. The partial payment authorization system of claim 1, wherein the operations further comprise receiving an acceptance of a partial payment amount based on communicating, to the point-of-sale system, the partial payment authorization, and prompting for payment of a remainder amount, wherein the remainder amount comprises a difference between the transaction payment amount and the partial payment amount.

10. The partial payment authorization system of claim 1, wherein the operations further comprise receiving a rejection of the partial payment authorization and prompting for payment of the transaction payment amount via an alternate form of payment.

11. The partial payment authorization system of claim 1, wherein the operations further comprise providing for a graphical user interface (GUI) to reconfigure the one or more partial payment authorization rules.

12. A non-transitory computer-readable medium storing instructions that, when executed by a computer system, cause the computer system to perform operations comprising:

receiving, from a point-of-sale system comprising a payment terminal communicatively coupled to a partial payment authorization system, a request for payment comprising a credit account information, a transaction payment amount, and a partial payment indicator;

querying an account database communicatively coupled to the partial payment authorization system, to retrieve an available credit amount based on the credit account information;

determining that there is an insufficient credit amount to complete the request for payment based on the available credit amount and the transaction payment amount;

determining a partial payment authorization or a denial of the request for payment based on one or more partial payment authorization rules, the credit account information, the transaction payment amount, and the insufficient credit amount, wherein the determining the denial of the request for payment comprises applying a merchant category code (MCC) rule, wherein applying the MCC comprises:

automatically determining, by comparing a MCC included in the request for payment, that the MCC is representative of a transportation payment or a dining payment; and automatically determining that the request for payment should result in the denial of the request for payment when the MCC is representative of the transportation payment or of the dining payment and when it is determined that there is an insufficient credit amount to complete the request for payment; and communicating, to the payment terminal, the partial payment authorization or the denial of the request for payment, wherein the one or more partial payment authorization rules comprise the MCC rule, a percent of transaction rule, an account status rule, a product rule, a partial payment amount rule, or a combination thereof, wherein the payment terminal is configured to scan a credit card for the credit account information, the transaction payment amount, and the partial payment indicator, and to communicate the request for payment to the partial payment authorization system.

13. The non-transitory computer-readable medium storing instructions of claim 12, wherein the one or more partial payment authorization rules comprise a testing rule, and wherein the operations comprise applying the one or more partial payment authorization rules to a test group of users when the testing rule is turned on.

14. The non-transitory computer-readable medium storing instructions of claim 12, wherein the operations comprise providing for a graphical user interface (GUI) to reconfigure the one or more partial payment authorization rules.

15. A method comprising:

receiving, from a point-of-sale system comprising a payment terminal communicatively coupled to a partial payment authorization system, a request for payment comprising a credit account information, a transaction payment amount, and a partial payment indicator;

querying an account database communicatively coupled to the partial payment authorization system, to retrieve an available credit amount based on the credit account information;

determining that there is an insufficient credit amount to complete the request for payment based on the available credit amount and the transaction payment amount;

determining a partial payment authorization or a denial of the request for payment based on one or more partial payment authorization rules, the credit account information, the transaction payment amount, and the insufficient credit amount, wherein the determining the denial of the request for payment comprises applying a merchant category code (MCC) rule, wherein applying the MCC comprises:

automatically determining, by comparing a MCC included in the request for payment, that the MCC is representative of a transportation payment or a dining payment; and automatically determining that the request for payment should result in the denial of the request for payment when the MCC is representative of the transportation payment or of the dining payment and when it is determined that there is an insufficient credit amount to complete the request for payment; and communicating, to the payment terminal, the partial payment authorization or the denial of the request for payment, wherein the one or more partial payment authorization rules comprise the MCC rule, a percent of transaction rule, an account status rule, a product rule, a partial payment amount rule, or a combination thereof, wherein the payment terminal is configured to scan a credit card for the credit account information, the transaction payment amount, and the partial payment indicator, and to communicate the request for payment to the partial payment authorization system.

16. The method of claim 15, wherein the one or more partial payment authorization rules comprise a testing rule, and wherein the method comprises applying the one or more partial payment authorization rules to a test group of users when the testing rule is turned on.

17. The method of claim 15, comprising providing for a graphical user interface (GUI) to reconfigure the one or more partial payment authorization rules.

\* \* \* \* \*